I. TAKÁCS.
ELECTRIC TRAP.
APPLICATION FILED MAY 10, 1911.
1,023,599.
Patented Apr. 16, 1912.
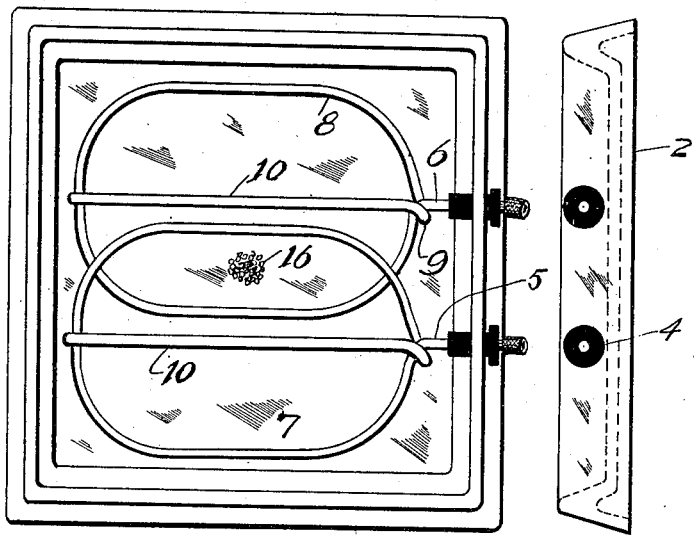
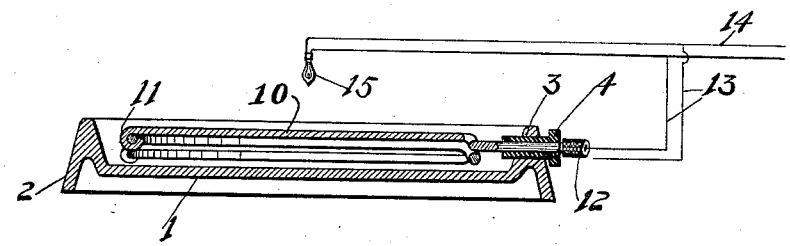
WITNESSES:
Erich Burkly
INVENTOR.
BY ISTVAN TAKÁCS
ATTORNEYS.

UNITED STATES PATENT OFFICE.

ISTVÁN TAKÁCS, OF BARBERTON, OHIO.

ELECTRIC TRAP.

1,023,599.  Specification of Letters Patent.  Patented Apr. 16, 1912.

Application filed May 10, 1911. Serial No. 626,246.

*To all whom it may concern:*

Be it known that I, ISTVÁN TAKÁCS, a subject of the King of Hungary, residing at Barberton, in the county of Summit and State of Ohio, have invented certain new and useful Improvements in Electric Traps, of which the following is a specification, reference being had therein to the accompanying drawing.

This invention relates to an electric trap particularly designed for exterminating rats and other rodents by utilizing electricity.

The object of the invention is to provide a simple, durable and inexpensive trap that can be used in connection with an ordinary electric light circuit of 110 volts, for shocking and electrocuting a rat.

With the above and other objects in view the invention resides in a novel construction, combination and arrangement of parts to be hereinafter specifically described and then claimed.

Reference will now be had to the drawing, wherein:—

Figure 1 is a plan of the trap, Fig. 2 is a side elevation of the same, and Fig. 3 is a cross sectional view of the trap.

A trap in accordance with this invention comprises a rectangular receptacle 1 having a depending flange 2 adapted to support the receptacle upon the floor or other support. The flange 2 is formed integral with the upper edges of the receptacle and extends downwardly below the bottom of the receptacle to form a substantial base for the same.

One of the walls of the receptacle 1 is provided with two transverse openings 3 and mounted in said openings are insulators 4 made of rubber or porcelain. Extending through the insulators 4 are rigid wires 5 and 6, said wires being bent to form horizontal loops 7 and 8 respectively extending over the bottom of the receptacle 1 and out of contact with each other, the wires being bent whereby the loop 7 will over-lap or extend over a portion of the loop 8. The ends of the wires 5 and 6 after being bent to form the loops are twisted, as at 9 and bent to the outer ends of the loops to form longitudinal rods 10, the outer ends of the rods being bent around the outer ends of the loops 7 and 8, as at 11. The loops being out of contact with each other, are insulated from each other by reason of the insulators 4. By the particular shape and arrangement of loops, it will be readily understood that the loops provide a multiplicity of points where contact may be made to complete the electrocuting circuit, without the necessity of providing a multiplicity of leading-in wires or circuit connections, each of the two loops shown being complete in itself and connected directly to the circuit connections.

The wires 5 and 6 are connected by couplings 12 to the branch wires 13 of main supply wires 14, these wires leading from a suitable source of electrical energy, as a battery or an ordinary electric light circuit. The main wires 14 are adapted to supply a current to an incandescent lamp 15 located above a trap and above a bait 16 placed upon the receptacle 1 between the inner sides of the loops 7 and 8.

The wires 5 and 6 represent positive and negative poles of a suitable source of electrical energy, and when a rat's body connects the loop or rod of one wire to the loop or rod of the other wire, the body is immediately shocked and electrocuted.

What I claim is:—

1. In an electric rat trap, a support having an upwardly projecting flange, a plurality of overlapping loops separated from each other and arranged within the planes of said flange and supported thereby in insulated relationship, said loops being connected to circuit connections extending through the flange.

2. In an electric rat trap, a support having a base and a flange projecting above the base to form a receptacle, a plurality of over-lapping loops separated from each other and arranged within the receptacle and supported thereby in insulated relationship, said loops being connected to circuit connections extending through said flange.

3. In an electric rat trap, a support having a base and a flange projecting above the base to form a receptacle, a plurality of overlapping wire loops separated from each other and arranged within the receptacle and supported thereby in insulated relationship, said loops being connected to circuit connections extending through said flange, the wire forming a loop being bent to provide a rod connecting the ends of the loop.

In testimony whereof I affix my signature in the presence of two witnesses.

ISTVÁN TAKÁCS.

Witnesses:
 FRANK BARBER,
 S. J. BERLECZKY.

---

Copies of this patent may be obtained for five cents each, by addressing the "Commissioner of Patents, Washington, D. C."